(12) United States Patent
Matsushima

(10) Patent No.: US 7,106,407 B2
(45) Date of Patent: Sep. 12, 2006

(54) LIQUID CRYSTAL DISPLAY DEVICE AND ELECTRONIC APPARATUS

(75) Inventor: Toshiharu Matsushima, Suwa (JP)

(73) Assignee: Seiko Epson Corporation, (JP)

( * ) Notice: Subject to any disclaimer, the term of this patent is extended or adjusted under 35 U.S.C. 154(b) by 52 days.

(21) Appl. No.: 11/127,604

(22) Filed: May 12, 2005

(65) Prior Publication Data

US 2005/0264732 A1 Dec. 1, 2005

(30) Foreign Application Priority Data

May 28, 2004 (JP) ............................... 2004-158928

(51) Int. Cl.
*G02F 1/1337* (2006.01)
(52) U.S. Cl. ..................... 349/130; 349/129; 349/114
(58) Field of Classification Search ............... 349/114, 349/129, 130
See application file for complete search history.

(56) References Cited

U.S. PATENT DOCUMENTS

| | | | |
|---|---|---|---|
| 4,701,028 A | 10/1987 | Clerc et al. | |
| 4,889,412 A | 12/1989 | Clerc et al. | |
| 6,108,064 A * | 8/2000 | Minoura et al. | 349/130 |
| 6,753,939 B1 * | 6/2004 | Jisaki et al. | 349/114 |
| 6,765,637 B1 * | 7/2004 | Takenaka | 349/113 |
| 6,806,927 B1 * | 10/2004 | Nimura | 349/113 |
| 6,819,379 B1 * | 11/2004 | Kubo et al. | 349/114 |
| 6,900,863 B1 * | 5/2005 | Okamoto et al. | 349/114 |
| 6,922,219 B1 * | 7/2005 | Jin et al. | 349/113 |
| 2005/0134771 A1 * | 6/2005 | Kim et al. | 349/114 |

FOREIGN PATENT DOCUMENTS

| | | |
|---|---|---|
| JP | 2000-040428 | 2/2000 |
| JP | 2002-350853 | 12/2002 |

OTHER PUBLICATIONS

M. Jisaki, et al., "Development of transflective LCD for high contrast and wide viewing angle by using homeotropic alignment", Asia Display / IDW '01, pp 133-136 (2001).

* cited by examiner

*Primary Examiner*—James A. Dudek
(74) *Attorney, Agent, or Firm*—Harness, Dickey & Pierce, P.L.C.

(57) ABSTRACT

A liquid crystal display device includes a viewing side circularly polarizing member provided outside the viewing side substrate. The viewing side circularly polarizing member includes a linearly polarizing plate and a retardation plate. The absorption axis of the linearly polarizing plate is at an angle θ1 of −25° and the slow axis of the retardation plate being at an angle θ2 of +20° with respect to a 0° horizontal direction of the viewing side circularly polarizing member in plan view assuming the counterclockwise rotation in plan view is positive.

7 Claims, 9 Drawing Sheets

Δnd=0.7

Δnd=0.52

Δnd=0.46

LIQUID CRYSTAL DISPLAY DEVICE AND ELECTRONIC APPARATUS

BACKGROUND OF THE INVENTION

1. Technical Field

The present invention relates to a liquid crystal display device and an electronic apparatus, and more particularly, to the structure of a vertical-alignment-type liquid crystal display device.

2. Related Art

A transflective liquid crystal display device having both a reflective mode and a transmissive mode has been known as an example of a liquid crystal display device. However, such a liquid crystal display device has a problem in that the viewing angle is narrow in transmissive display. That is, if a transflective plate is provided on the inner surface of a liquid crystal cell to prevent the generation of parallax, then reflective display should be performed using only one polarizing plate provided at the observer side. However, this restricts the degree of freedom of the optical design. In order to solve this problem, liquid crystal display devices using homeotropic liquid crystal have been disclosed in the following documents: Japanese Unexamined Patent Application Publication No. 2002-350853, Japanese Unexamined Patent Application Publication No. 2000-40428, and "Development of transflective LCD for high contrast and wide viewing angle by using homeotropic alignment", M. Jisaki et al., Asia Display/IDW'01, pp. 133–136 (2001).

A vertical-alignment-type liquid crystal display device is a liquid crystal display device adopting a 'VA (Vertical Alignment) mode'. That is, the liquid crystal molecules have a negative dielectric anisotropy and so are vertically aligned with respect to a substrate when no voltage is applied and are inclined when a voltage is applied. In the liquid crystal display device disclosed in these documents, a transmissive display region is formed, for example, in a regular octagon shape, and a projection is provided at the center of each transmissive display region on a counter electrode to incline the liquid crystal molecules in the eight directions. This is called an 'alignment division structure' and enables the viewing angle to be widened.

Of course, in the above-mentioned documents, in order to allow circularly polarized light to be incident on a liquid crystal layer, a circular polarizing plate formed by combining a linearly polarizing plate with a quarter-wave plate (retardation plate) is provided on the outer surface of a substrate. The characteristics of the circularly polarizing plate have a great effect on the viewing angle characteristic. However, the above-mentioned documents do not describe the detailed structure of the circularly polarizing plate and have a problem in that contrast may be lowered in accordance with the viewing angle. That is, since the circularly polarizing plate allows circularly polarized light to be incident on the liquid crystal layer, it is possible to obtain normal display regardless of which direction the circularly polarizing plate faces. However, since a user views an image through the linearly polarizing plate, the contrast depends on the viewing angle. When viewing a display device, it is necessary that the contrast characteristic be particularly symmetric in the horizontal direction. Thus, it is desirable to realize a liquid crystal display device having such a viewing angle characteristic. The transflective liquid crystal display device has been given as an example in the above statement. However, the above-mentioned problems can arise in a transmissive liquid crystal display device as well as a transflective liquid crystal display device.

SUMMARY

An advantage of the present invention is that it provides a vertical-alignment-type liquid crystal display device having the symmetric contrast characteristic. In addition, another advantage of the invention is that it provides an electronic apparatus having this type of liquid crystal display device as a display unit.

A liquid crystal display device according to a first aspect of the invention includes a viewing side substrate; another substrate opposing the viewing side substrate; a liquid crystal layer interposed between the viewing side substrate and the other substrate, the liquid crystal layer being composed of liquid crystal having a negative dielectric anisotropy and so is vertically aligned in an initial state; an other substrate circularly polarizing member provided outside the other substrate, the other substrate circularly polarizing member enabling substantially circularly polarized light to be incident on the liquid crystal layer; and a viewing side circularly polarizing member provided outside the viewing side substrate, the viewing side circularly polarizing member enabling substantially circularly polarized light to be incident on the liquid crystal layer, the viewing side circularly polarizing member including: a linearly polarizing plate; a first retardation plate that shifts the phase of the incident light by about a quarter wavelength; and a second retardation plate having substantially no phase difference in the plane thereof and having a phase difference in the normal direction thereof, the liquid crystal, linearly polarizing plate.

In particular, the liquid crystal, the linearly polarizing plate, and the first and second retardation plates satisfy the following relationships:

1) in the case that $0.8 \times \Delta n \cdot d - 160 < 2 \times Rc < 0.8 \times \Delta n \cdot d - 20$, then $$\theta1 = 0.25 \times 2 \times Rc - 0.2 \times \Delta n \cdot d + 15 +/- 5 \text{ and}$$

$$\theta2 = \theta1 + 45°;$$

2) in the case that $2 \times Rc < 0.8 \times \Delta n \cdot d - 160$, then $$\theta1 = -25° \text{ and}$$

$$\theta2 = +20°; \text{ and}$$

3) in the case that $0.8 \times \Delta n \cdot d - 20 < 2 \times Rc$, then $$\theta1 = +10° \text{ and}$$

$$\theta2 = +55°$$

wherein Rc is the phase difference of the second retardation plate, $\Delta n$ is the refractive index anisotropy of the liquid crystal, d is the thickness of the liquid crystal layer, $\theta1$ is the angle of the absorption axis of the linearly polarizing plate with respect to a 0° horizontal direction of the viewing side circularly polarizing member in plan view assuming the counterclockwise rotation in plan view is positive, and $\theta2$ is the angle of the slow axis of the first retardation plate with respect to a 0° horizontal direction of the viewing side circularly polarizing member in plan view assuming the counterclockwise rotation in plan view is positive.

In addition, a liquid crystal display device according to a second aspect of the invention includes a viewing side substrate; another substrate opposing the viewing side substrate; a liquid crystal layer interposed between the viewing side substrate and the other substrate, the liquid crystal layer being composed of liquid crystal having a negative dielectric anisotropy and so is vertically aligned in an initial state; an other substrate circularly polarizing member provided outside the other substrate, the other substrate circularly polarizing member enabling substantially circularly polarized light to be incident on the liquid crystal layer; and a viewing side circularly polarizing member provided outside the viewing side substrate, the viewing side circularly polarizing member enabling substantially circularly polarized light to be incident on the liquid crystal layer, the viewing side circularly polarizing member including: a linearly polarizing plate; a first retardation plate that shifts the phase of the incident light by about a quarter wavelength; and a second retardation plate having substantially no phase difference in the plane thereof and having a phase difference in the normal direction thereof.

In particular, the liquid crystal, linearly polarizing plate, and the first and second retardation plates satisfying the following relationships:

1) in the case that $0.8 \times \Delta n \cdot d - 160 < 2 \times Rc < 0.8 \times \Delta n \cdot d - 20$, then $\theta 1 = -0.25 \times 2 \times Rc + 0.2 \times \Delta n \cdot d - 15 +/- 5$ and $\theta 2 = \theta 1 - 45°$;

2) in the case that $2 \times Rc < 0.8 \times \Delta n \cdot d - 160$, then $\theta 1 = +25°$ and $\theta 2 = -20°$; and 3) in the case that $0.8 \times \Delta n \cdot d - 20 < 2 \times Rc$, then $\theta 1 = -10°$ and $\theta 2 = -55°$ wherein Rc is the phase difference of the second ion plate,
$\Delta n$ is the refractive index anisotropy of the liquid crystal,
d is the thickness of the liquid crystal layer,
$\theta 1$ is the angle of the absorption axis of the linearly polarizing plate with respect to a 0° horizontal direction of the viewing side circularly polarizing member in plan view assuming the counterclockwise rotation in plan view is positive, and
$\theta 2$ is the angle of the slow axis of the first retardation plate with respect to a 0° horizontal direction of the viewing side circularly polarizing member in plan view assuming the counterclockwise rotation in plan view is positive.

As described above, on the premise that a liquid crystal layer of a vertical alignment mode is incorporated into the liquid crystal display device, a linearly polarizing plate, a first retardation plate (hereinafter, referred to as a quarter-wave plate) that shifts the phase of incident light by a quarter wavelength, a second retardation plate (hereinafter, referred to as a C plate) not having a phase difference on the surface thereof but having a phase difference in the normal direction of the surface are used as a circularly polarizing member. The inventors simulate the variation of the viewing angle characteristic (symmetry) in black display when varying the arrangement of the optical axis of the linearly polarizing plate or the retardation plate, focusing attention on the fact that the symmetry of the contrast characteristic is more greatly influenced by the symmetry of black display than by the symmetry of white display (simulation results will be described later). As a result, in the four aspects, the inventors found that, when the optical axes of the linearly polarizing plate and the retardation plate were set so as to satisfy the above-mentioned ranges, the bilateral symmetry of black display was obtained, and thus the bilateral symmetry of the contrast characteristic was obtained.

That is, in the liquid crystal display devices according to the first and second aspects of the invention, the circularly polarizing member at the viewing side includes at least a linearly polarizing plate and a quarter-wave plate. In the liquid crystal display devices according to the third and fourth aspects of the invention, the circularly polarizing member at the viewing side includes at least a linearly polarizing plate, a quarter-wave plate (the first retardation plate), and a C plate (the second retardation plate). In this structure, the angel of the absorption axis of the linearly polarizing plate at the viewing side and the angle of the slow axis of the quarter-wave plate at the viewing side are determined. In addition, the invention can obtain the same effects as described at the angles formed by simultaneously rotating these angles by 90°.

Further, the difference in structure between the liquid crystal display device according to the first aspect and the liquid crystal display device according to the second aspect of the invention is that the rotation directions of the circularly polarized light incident on the liquid crystal layer are different from each other. Similarly, the difference in structure between the liquid crystal display device according to the third aspect and the liquid crystal display device according to the fourth aspect of the invention is that the rotation directions of the circularly polarized light incident on the liquid crystal layer are different from each other.

Furthermore, for a circularly polarizing plate formed by combining a quarter-wave plate, a half wavelength plate (broadband quarter-wave plate), and a linearly polarizing plate, the inventors examined the viewing angle characteristics when $N_Z$ coefficients $(=(nx-nz)/(nx-ny))$ of the respective retardation plates were changed. The results are shown as equi-brightness curves in black display in FIG. 8. In this case, the absorption axis of the linearly polarizing plate is arranged in the horizontal direction (0°). As shown in FIG. 8, in the above-mentioned arrangement of the optical axis, the black display characteristic is not symmetric with respect to the vertical axis. Therefore, in order to make the black display characteristic symmetric with respect to the vertical axis, it is necessary to rotate the linearly polarizing plate and the retardation plate by a predetermined angle according to the Nz coefficient of the retardation plate.

Furthermore, FIGS. 9A to 9C show equi-brightness curves in black display when the above-mentioned circularly polarizing plate is fixed at a predetermined angle, and when the retardation $\Delta n \cdot d$ of liquid crystal is changed. From these results, it is understood that, when the values of $\Delta n \cdot d$ of liquid crystal are different, bilateral symmetry is not obtained although the same retardation plate is rotated by the same angle. That is, in order to obtain bilateral symmetry in black display, it is also necessary to rotate the linearly polarizing plate and the retardation plate by a predetermined angle according to the value of $\Delta n \cdot d$ of liquid crystal.

Moreover, FIG. 10A shows an equi-brightness curves in black display when the optical axis of the circularly polarizing plate at the viewing side is fixed and the optical axis of the circularly polarizing plate at the light incident side (backlight side) is arranged orthogonal to the circularly polarizing plate at the viewing side, and FIG. 10B shows an equi-brightness curves in black display when the optical axis of the circularly polarizing plate at the viewing side is fixed and the optical axis of the circularly polarizing plate at the light incident side is rotated with respect to the circularly polarizing plate at the viewing side by 45°. In addition, FIG. 10C shows an equi-brightness curve in black display when the optical axis of the circularly polarizing plate at the viewing side is fixed and the optical axis of the circularly polarizing plate at the light incident side is rotated with respect to the circularly polarizing plate at the viewing side by 90°. From these results, it is understood that, when the optical axis of the circularly polarizing plate at the light incident side (backlight side) is arranged orthogonal to the optical axis of the circularly polarizing plate at the viewing side, symmetry is obtained with respect to the vertical and horizontal axes. On the other side, when the optical axis of the circularly polarizing plate at the light incident side is rotated with respect to the optical axis of the circularly polarizing plate at the viewing side by 45° or 90°, symmetry with respect to the horizontal axis is not obtained, but symmetry with respect to the vertical axis is obtained. Therefore, the circularly polarizing plate at the viewing side is also arranged at a predetermined angle, it is possible to realize bilateral symmetry. Thus, the circularly polarizing plate at the light incident side may be formed of a polarizing plate for allowing light to be circularly polarized in the direction corresponding to the circularly polarizing plate at the viewing side.

The invention has been made based on the above-mentioned technical knowledge of the inventors.

In addition, preferably, the optical axes of the circularly polarizing members are arranged such that the absorption axis of the linearly polarizing plate provided at the viewing side is substantially orthogonal to the absorption axis of the linearly polarizing plate provided at the other side, and such that the slow axis (or fast axis) of the retardation plate provided at the viewing side is substantially orthogonal to the slow axis (or fast axis) of the retardation plate provided at the other side.

According to this arrangement of the optical axes, it is possible to obtain the black display characteristic having symmetry with respect to both the vertical axis and the horizontal axis.

Furthermore, preferably, the liquid crystal display device further includes a plurality of pixels arranged in a matrix, and in each pixel, the liquid crystal preferably has an alignment division structure.

The vertical-alignment-type liquid crystal display device is of a normally black mode in which black display appears when no voltage is applied. However, according to this structure, liquid crystal molecules are uniformly inclined in all directions by the alignment division structure when a voltage is applied. Therefore, it is possible to obtain symmetry in white display, and thus it is possible to improve the symmetry of contrast and to widen the viewing angle.

Moreover, the invention can be applied to a transflective liquid crystal display device in which each dot region is provided with a transmissive display region that performs transmissive display and a reflective display region that performs reflective display.

According to this structure, it is possible to obtain a liquid crystal display device having high visibility and a wide viewing angle, particularly, in transmissive display, regardless of the brightness of the place used.

An electronic apparatus of the invention has the liquid crystal display device according to the invention.

According to this structure, it is possible to realize an electronic apparatus equipped with a liquid crystal display device having a wide viewing angle and contrast characteristic having symmetry in the horizontal direction.

BRIEF DESCRIPTION OF THE DRAWINGS

The invention will be described with reference to the accompanying drawings, wherein like reference numerals refer to like elements, and wherein.

DESCRIPTION OF THE EMBODIMENTS

First Embodiment

Hereinafter, a first embodiment of the present invention will be described with reference to the accompanying drawings.

A liquid crystal display device of the embodiment is an example of an active matrix liquid crystal display device using thin film transistors (hereinafter, referred to as TFTS) as switching elements.

Figure 1:
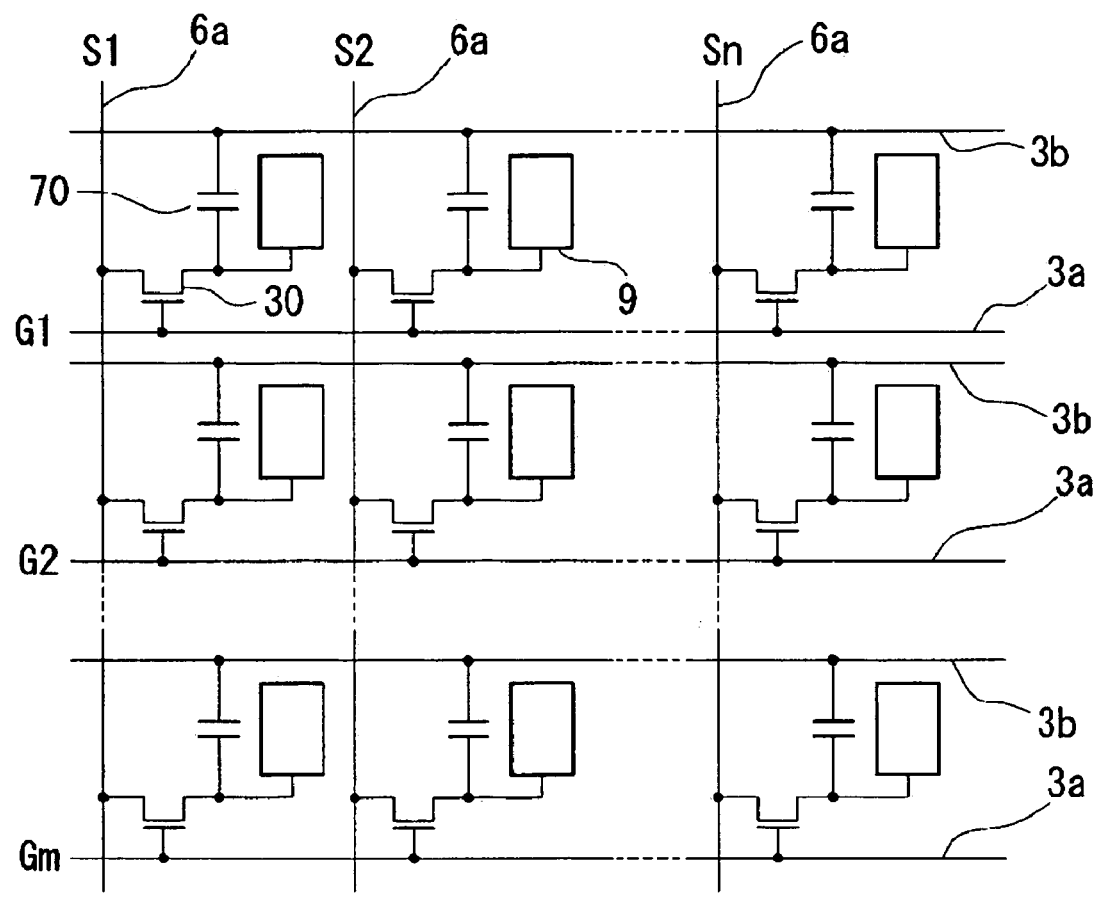
FIG. 1 is an equivalent circuit diagram of a plurality of dots of a liquid crystal display device in accordance with a first embodiment of the invention.
Figure 2:
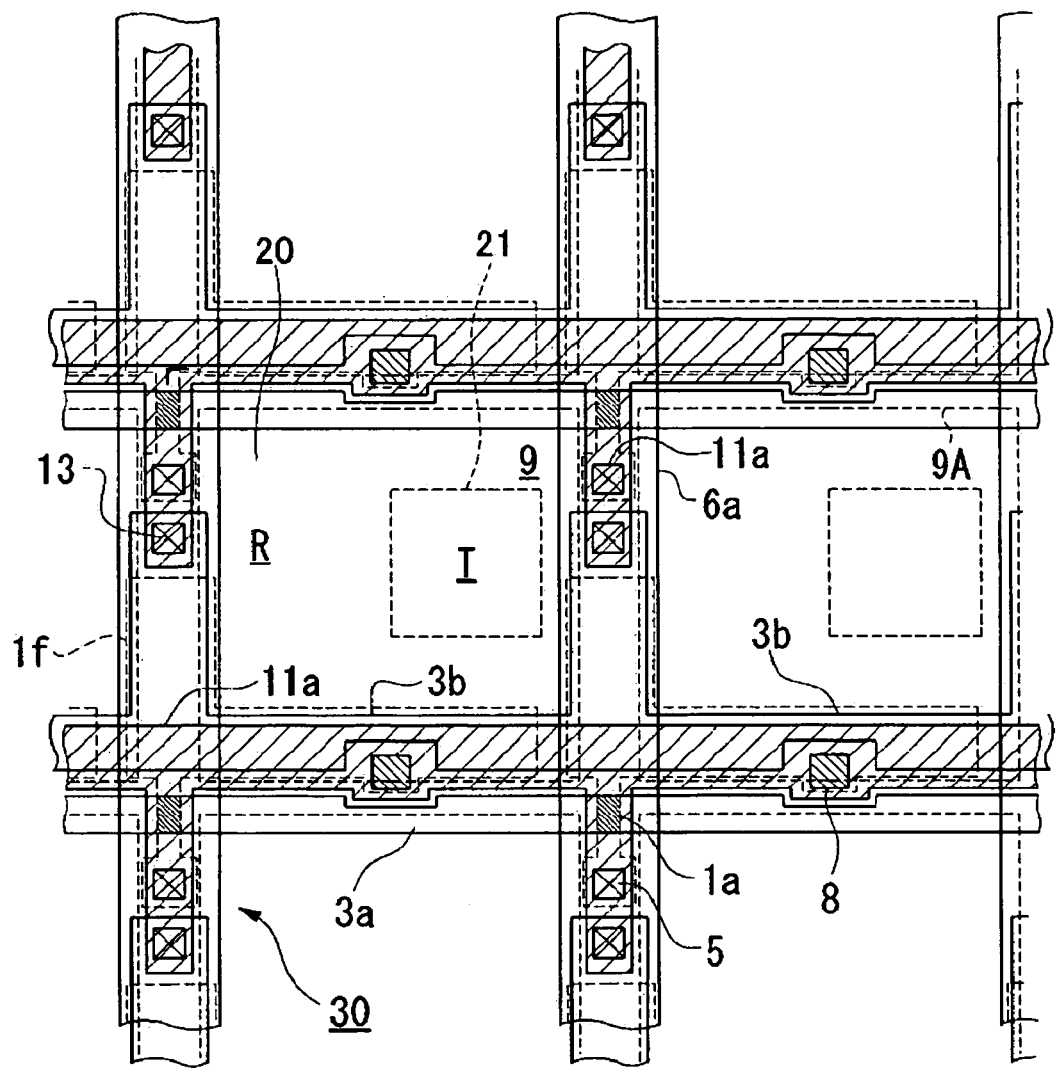
FIG. 2 is a plan view illustrating the plurality of dots adjacent to each other on a TFT array substrate of the liquid crystal display device in accordance with the first embodiment.
Figure 3:
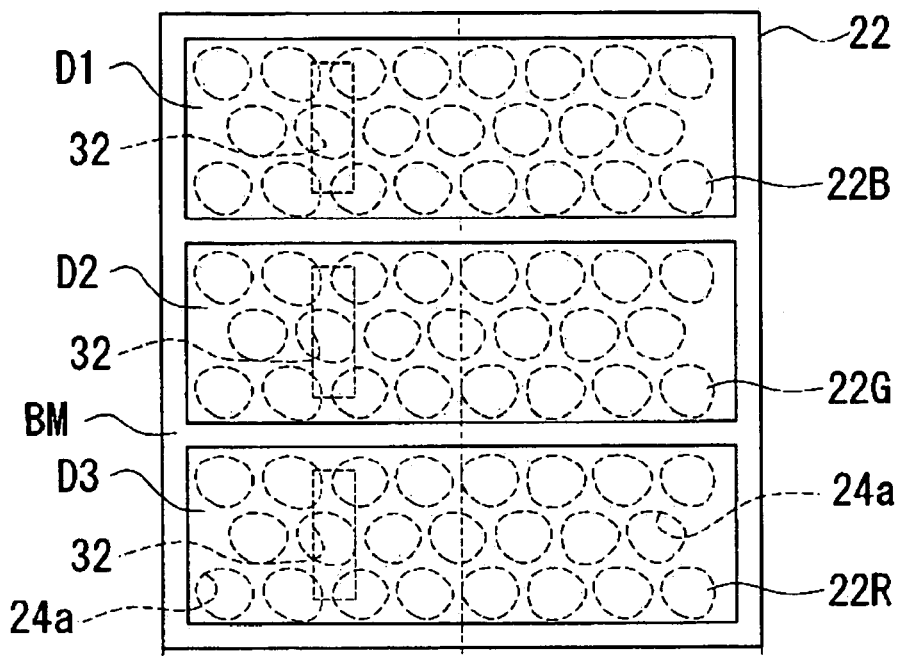
FIG. 3A is a plan view illustrating the structure of the liquid crystal display device in accordance with the first embodiment.
FIG. 3B is a cross-sectional view corresponding to FIG. 3A.
Figure 3:
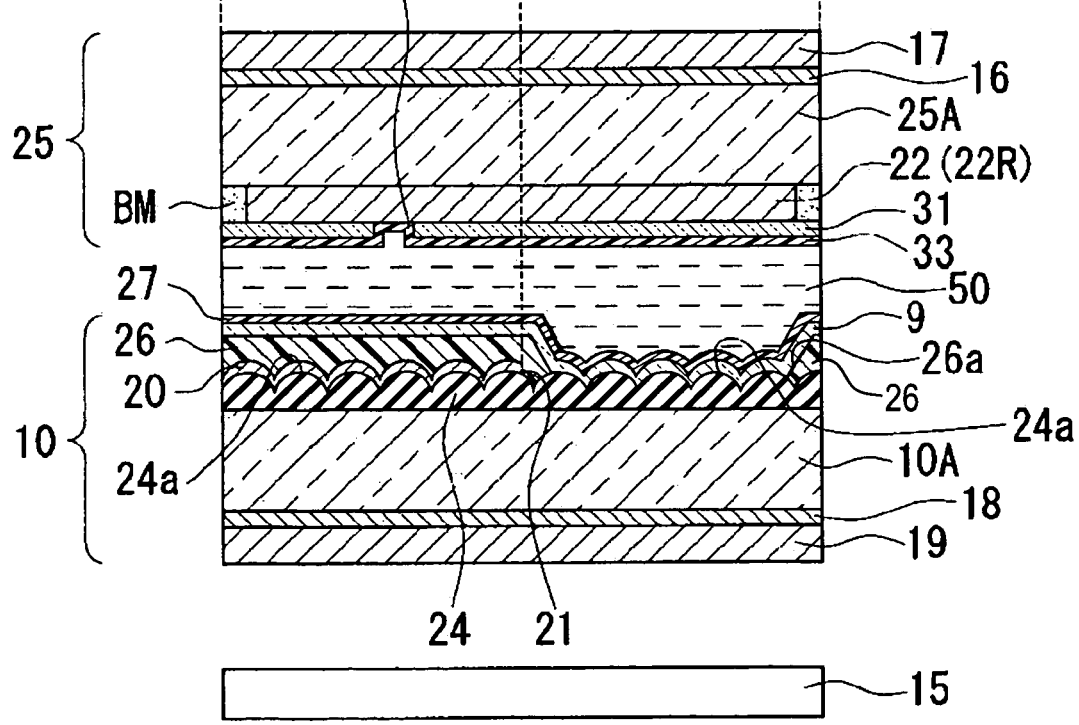

FIG. 1 is an equivalent circuit diagram of a plurality of dots arranged in a matrix and constituting an image display region of the liquid crystal display device according to the first embodiment, and FIG. 2 is a plan view illustrating the structure of the plurality of dots adjacent to a TFT array substrate. FIG. 3A is a plan view illustrating the structure of the liquid crystal display device, and FIG. 3B is a cross-sectional view thereof. Further, in the following figures, the size of each layer or each member is scaled to be different from each other in each figure so as to allow the layer or the member to be recognizable in the figures.

In the liquid crystal display device of the first embodiment, as shown in FIG. 1, pixel electrodes 9 and TFTs 30, serving as switching elements for controlling the pixel electrodes 9, are provided in the plurality of dots arranged in a matrix and constituting the image display region, respectively, and data lines 6a to which image signal are supplied are electrically connected to sources of the TFTs 30, respectively. Image signals S1, S2, ..., Sn to be written to the data lines 6a are line-sequentially supplied in that order, or are supplied to each group consisting of a plurality of data lines 6a adjacent to each other. Further, scanning lines 3a are electrically connected to gates of the TFTs 30, respectively, and scanning signals G1, G2, ..., Gm are line-sequentially supplied in pulses to a plurality of scanning lines 3a at a predetermined timing. The pixel electrodes 9 are electrically connected to drains of the TFTs 30, respectively, and by turning on the TFTs 30, functioning as the switching elements, for a certain period of time, the image signals S1, S2, ..., Sn supplied from the data lines 6a are written at a predetermined timing. Predetermined levels of the image signals S1, S2, ..., Sn written to liquid crystal through the pixel electrodes 9 are held between the pixel electrodes and a common electrode, which will be described later, for a predetermined period. The alignment or order of liquid crystal molecules varies in accordance with the voltage level applied thereto to modulate light, which enables gray-scale display. In order to prevent the held image signals from leaking, storage capacitors 70 are additionally provided in parallel to the liquid crystal capacitance formed between the pixel electrodes 9 and the common electrode. Reference numeral 3b denotes a capacitor line.

Referring to FIG. 2, the two-dimensional structure of the TFT array substrate constituting the liquid crystal display device according to the first embodiment will be described below. As shown in FIG. 2, a plurality of rectangular pixel electrodes 9 (whose profiles are represented by dotted lines 9A) are provided in a matrix on the TFT array substrate, and the data lines 6a, the scanning lines 3a, and the capacitor lines 3b are provided along the longitudinal and transverse boundaries of the pixel electrodes 9. In the first embodiment, each pixel electrode 9 and the inside of an area in which the data lines 6a, the scanning lines 3a, and the capacitor lines 3b arranged to surround the pixel electrode 9 are formed constitutes one dot area, and each dot area arranged in a matrix can perform display.

The data lines 6a are electrically connected through contact holes 5 to source regions, which will be described below, in a semiconductor layer 1a that is composed of, for example, a polysilicon film and constitutes the TFTs 30, and the pixel electrodes 9 are electrically connected through contact holes 8 to drain regions, which will be described below, in the semiconductor layer 1a, respectively. In addition, the scanning lines 3a are arranged to face channel regions (regions hatched in the upper left direction in FIG. 2) in the semiconductor layer 1a, and a portion of each of the scanning lines 3a facing the channel region serves as a gate electrode. Each capacitor line 3b has a main line portion (that is, a first area formed along the scanning lines 3a in plan view) extending substantially in a straight line shape along the scanning lines 3a, and projecting portions (that is, a second area extending along the data lines 6a) projecting from portions intersecting the data lines 6a toward the previous stage (in the upper direction of FIG. 2) along the data lines 6a. In FIG. 2, the areas hatched in the upper right direction are provided with a plurality of first light shielding films 11a.

More specifically, the first light shielding films 11a are respectively provided at positions where the TFTs 30 including the channel regions of the semiconductor layer 1a are covered as seen from the TFT array substrate side, and each has a main line portion extending in a straight line shape along the scanning line 3a so as to face the main line portion of the capacitor line 3b and a projecting portion projecting from portions intersecting the data lines 6a toward the next stage (in the downward direction in FIG. 2) along the data lines 6a. The leading ends of the downward projecting portions of the first light shielding film 11a at each stage (pixel row) overlap the leading ends of the upward projecting portions of the capacitor line 3b at the next stage under the data lines 6a. Contact holes 13 are respectively provided at these overlapped places for electrically connecting the first light shielding films 11a to the capacitor lines 3b. That is, in the first embodiment, the first light shielding films 11a are electrically connected to the capacitor lines 3b at the previous stage or the next stage through the contact holes 13. As shown in FIG. 2, a reflective film 20 is formed in one dot area. The area in which the reflective film 20 is formed becomes a reflective display area R, and the area in which the reflective film 20 is not formed, that is, an opening portion 21 of the reflective film 20, becomes a transmissive display area T.

Referring to FIGS. 3A and 3B, the plan-view and sectional structure of the liquid crystal display device according to the first embodiment will be described below.

FIG. 3A is a schematic plan view illustrating the structure of a color filter layer provided in the liquid crystal display device according to the first embodiment, and FIG. 3B is a schematic cross-sectional view corresponding to a red colored layer in the plan view of FIG. 3A.

As shown in FIG. 2, the liquid crystal display device according to the first embodiment has dot areas, and in each dot area, the pixel electrode 9 is provided in the inside of the area surrounded by the data line 6a, the scanning line 3a, and the capacitor line 3b. In the dot areas, as shown in FIG. 3A, a layer colored in any one of the three primary colors is provided corresponding to one dot area, and three dot areas D1, D2, and D3 constitute one pixel including blue, green, and red colored layers 22B, 22G, and 22R.

Meanwhile, as shown in FIG. 3B, in the liquid crystal display device according to the first embodiment, a liquid crystal layer 50 made of a liquid crystal material that is vertically aligned in an initial state and has a negative dielectric anisotropy is interposed between a TFT array substrate 10 and a counter substrate 25 opposite thereto. The TFT array substrate 10 has a construction in which a reflective film 20 made of a metallic material having high reflectivity, such as aluminum or silver, is partially formed on a surface of a substrate body 10A made of a transmissive material, such as quartz or glass, with an insulating film 24 interposed therebetween. As described above, the area in which the reflective film 20 is formed becomes the reflective display area R, and the area in which the reflective film 20 is not formed, that is, an opening portion 21 of the reflective film 20, becomes the transmissive display area T. As such, the liquid crystal display device according to the first embodiment is a vertical-alignment-type liquid crystal display device including a vertical-alignment-type liquid crystal layer 50, and is also a transflective liquid crystal display device capable of performing reflective display and transmissive display.

In addition, the surface of the insulating film 24 formed on the substrate body 10A has an uneven shape, and the surface of the reflective film 20 has uneven portions reflecting the uneven shape 24a of the insulating film. Since the reflected light is scattered by the unevenness, external reflection is prevented, so that it is possible to obtain a display having a wide viewing angle. An insulating film 26 is formed on the reflective film 20 at positions corresponding to the reflective display regions R. That is, the insulating film 26 is selectively formed so as to be positioned on the reflective film 20, and the thickness of the liquid crystal layer 50 in the reflective display region R is different from that in the transmissive display region T due to the formation of the insulating film 26. The insulating film 26 is composed of an organic film, such as acryl resin, having a thickness of about 2 to 3 μm, and has an inclined region, that is, an inclined surface 26a in the vicinity of the boundary between the reflective display region R and the transmissive display region T, so that the thickness of the insulating film can vary continuously. The thickness of the liquid crystal layer 50 in the portion in which the insulating film 26 is not formed is about 4 to 6 μm, and the thickness of the liquid crystal layer 50 in the reflective display region R is about half of the thickness of the liquid crystal layer 50 in the transmissive display region T.

As such, the insulating film 26 serves as a liquid crystal layer-thickness adjusting layer (a layer for controlling the thickness of the liquid crystal layer) to cause the thickness of the liquid crystal layer 50 in the reflective display region R to be different from that in the transmissive display region T due to its own thickness. In the first embodiment, the edge of the upper flat surface of the insulating film 26 and the edge of the reflective film 20 (reflective display region) substantially coincide with each other, and the inclined region of the insulating film 26 is included in the transmissive display region T. The pixel electrodes 9 composed of a transparent conductive film made of, for example, indium tin oxide (hereinafter, referred to as 'ITO') and an alignment film 27 made of, for example, polyimide are formed on the surface of the TFT array substrate 10 including the surface of the insulating film 26. Further, in the first embodiment, the reflective film 20 and the pixel electrodes 9 are separately prepared and stacked. However, a reflective film composed of a metal film may be used as the pixel electrode in the reflective display region R.

Meanwhile, in the transmissive display region T, the insulating film 24 is formed on the substrate body 10A, but the reflective film 20 and the insulating film 26 are not formed thereon. That is, the pixel electrode 9 and the alignment film 27 made of polyimide are formed on the insulting film 24.

In the counter substrate 25, color filters 22 (the red colored layer 22R in FIG. 3B) are formed on the inner surface of a substrate body 25A made of a transmissive material, such as glass or quartz. The circumferential edge of the colored layer 22R is surrounded with a black matrix BM, and the black matrix BM defines the boundaries among the dot areas D1, D2, and D3 (see FIG. 3A).

Further, a common electrode 31 made of a transparent conductive material, such as ITO, and an alignment film 33 made of, for example, polyimide are formed on a surface of the colored filter 22 facing the liquid crystal layer. Here, a concave portion 32 is formed in the common electrode 31 in the reflective display region R, and a concave portion (step portion) is formed in a surface of the alignment film 33 facing the liquid crystal layer 50, corresponding to the shape of the concave portion 32. The concave portion (step portion) formed in the surface facing the liquid crystal layer 50 has an inclined plane slanted at a predetermined angle with respect to the surface of the substrate (or the vertical alignment directions of liquid crystal molecules), so that the alignment direction of liquid crystal molecules vertically aligned in an initial state is regulated along the direction of the inclined plane. Further, in the first embodiment, a vertical alignment process is performed on both the alignment films 27 and 33 respectively formed on the TFT array substrate 10 and the counter electrode 25.

A quarter-wave plate 18 and a linearly polarizing plate 19 are bonded to an outer surface of the substrate body 10A of the TFT array substrate 10 in this order from the substrate body, with an adhesive layer (not shown) interposed therebetween. Similarly, a quarter-wave plate 16 and a linearly polarizing plate 17 are bonded to an outer surface of the substrate body 25A of the counter substrate 25 in this order from the substrate body, with an adhesive layer (not shown) interposed therebetween. The linearly polarizing plate 17 (19) and the quarter-wave plate 16 (18) constitute a circularly polarizing plate which enables circularly polarized light to be incident on the substrate (on the side of the liquid crystal layer 50). The linearly polarizing plates 17 and 19 each have a polarizing axis in a predetermined direction and function to transmit only linearly polarized light. The quarter-wave plates 16 and 18 each generate a phase difference (retardation) of a quarter wavelength with respect to incident light. In addition, a backlight 15 serving as a light source for transmissive display is provided on the outer surface of the linearly polarizing plate 19 attached to the TFT array substrate 10.

Next, a conceivable configuration for the liquid crystal display device of FIGS. 3A and 3B will be described. During this description, it will be assumed that the horizontal direction of the display screen (that is, the horizontal direction shown in FIG. 3A) is an angle of 0°, the counterclockwise rotation is positive, and the viewing side is the upper side in FIG. 3B. In the conceivable configuration, the absorption axis of the linearly polarizing plate 17 is aligned with the angle of 0°, and the slow axis of the quarter-wave plate 16 is oriented at an angle of 45°. In addition, the absorption axis of the linearly polarizing plate 19 is oriented at an angle of 90°, and the slow axis of the quarter-wave plate 18 is oriented at an angle of 135°. In this case, the circularly polarized light incident on the liquid crystal layer 50 makes a turn in the clockwise direction. In addition, the value of Δn·d of the liquid crystal layer 50 is 0.4.

Figure 4:
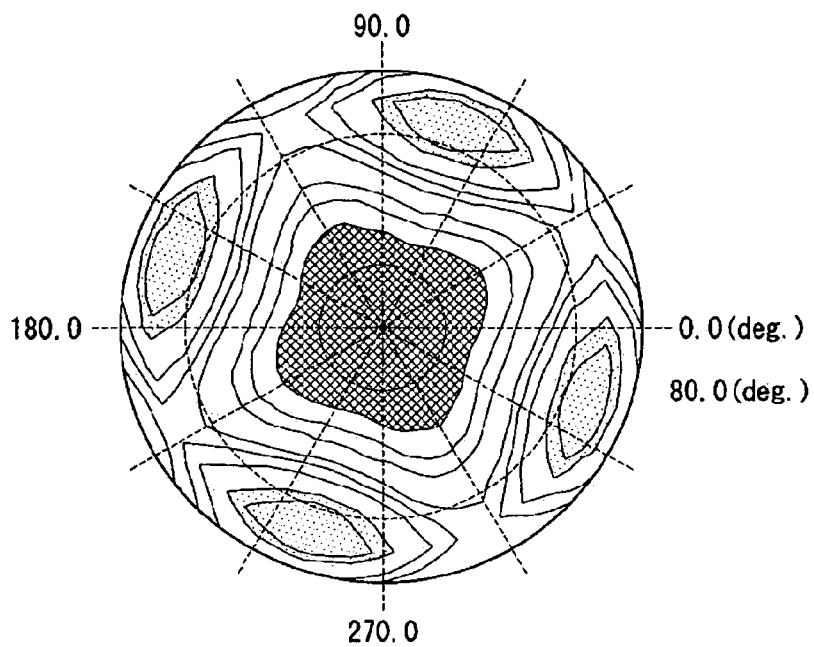
FIG. 4 is a view illustrating an equi-brightness curve of black display of the liquid crystal display device.

The inventors performed a simulation of the viewing angle characteristic in black display for the above-described conceivable configuration. The results are shown in FIG. 4. As shown, an equi-brightness curve in black display in coordinates with a polar angle (the normal direction of the panel) of 0° to 80° and an azimuth angle of 0° to 360°. Note that the black display characteristic is not symmetric with respect to the vertical axis (that is, with respect to a straight line linking two points corresponding to 90° and 270°), but is symmetric with respect to a straight line linking two points corresponding to 65° and 245°. Therefore, in order to make this characteristic symmetric with respect to the vertical axis, it is preferable to rotate only the linearly polarizing plate 17 and the quarter-wave plate 16 positioned at the viewing side by −25°. It is not necessary to rotate the linearly polarizing plate 17 and the quarter-wave plate 18 at the light incident side. As a result, the angle of the absorption axis of the linearly polarizing plate 17 at the viewing side becomes −25°, and the angle of the slow axis of the quarter-wave plate 16 at the viewing side becomes +20°. In this way, it is possible to obtain a liquid crystal display device in which the contrast characteristic is symmetric in the horizontal direction of the screen.

The above-mentioned characteristics are obtained by arranging the absorption axes of the upper and lower linearly polarizing plates 17 and 19 and the slow axes of the upper and lower quarter-wave plates 16 and 18 such that clockwise polarized light is incident on the liquid crystal layer 50. On the other hand, when counterclockwise polarized light is incident thereon, it is preferable that the angle of the absorption axis of the linearly polarizing plate 17 at the viewing side be +25°, and that the angle of the slow axis of the quarter-wave plate 16 at the viewing side be −20°.

Second Embodiment

Hereinafter, a second embodiment of the invention will be described with reference to the accompanying drawings.

The basic structure of a liquid crystal display device according to the second embodiment is similar to that in the first embodiment except that C plates are additionally provided on the upper and lower substrates, respectively.

Figure 5:
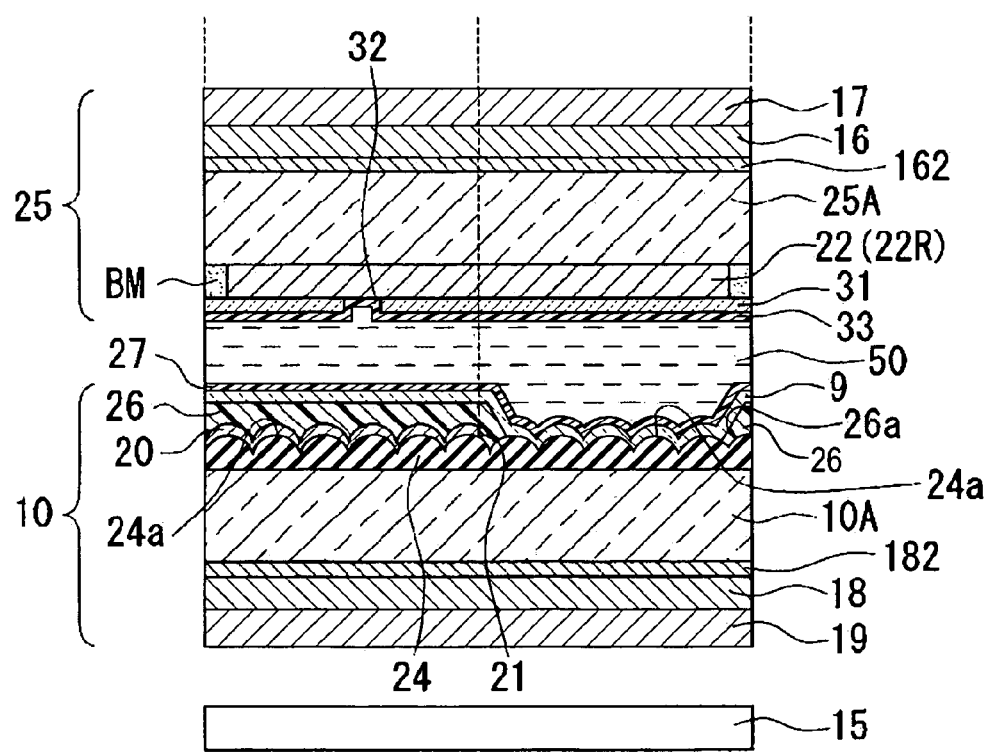
FIG. 5 is a cross-sectional view of a liquid crystal display device in accordance with a second embodiment of the invention.

FIG. 5 is a cross-sectional view of the liquid crystal display device according to the second embodiment. In FIG. 5, the same components as those in FIG. 3B have the same reference numerals, and thus a detailed description thereof will be omitted.

As shown in FIG. 5, in the liquid crystal display device of the second embodiment, a C plate 182, the quarter-wave plate 18, and the linearly polarizing plate 19 are formed on the outer surface of the substrate body 10A of the TFT array substrate 10 in this order from the substrate body, with an adhesive layer (not shown) interposed therebetween. Similarly, a C plate 162, the quarter-wave plate 16, and the linearly polarizing plate 17 are formed on the outer surface of the substrate body 25A of the counter substrate 25 in this order from the substrate body, with an adhesive layer (not shown) interposed therebetween. The C plates 162 and 182 used in this embodiment are retardation plates each not having a phase difference in its inner surface but having a phase difference in the normal direction of the substrate. That is, when the birefringence in the x-axis direction on the inner surface of the substrate is 'nx', the birefringence in the y-axis direction is 'ny', the birefringence in the z-axis direction is 'nz', and the thickness of the C plate is 'dc', a phase difference Rc of the C plate 162 or 182 is obtained by the following expression: Rc=dc×(nz−(nx+ny)/2), where 'nx' and 'ny' are substantially equal to each other.

Figure 6:
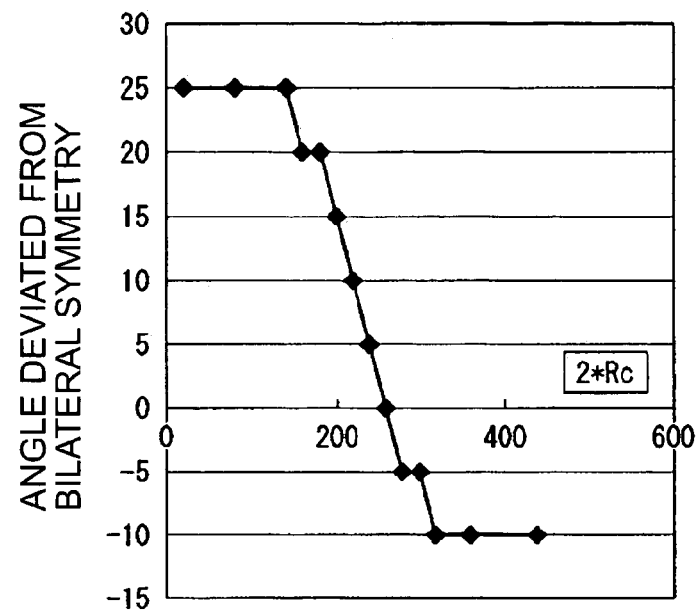
FIG. 6 is a view illustrating the relationship between a phase difference of a C plate and an angle deviated from bilateral symmetry in the liquid crystal display device according to the second embodiment.
Figure 7:
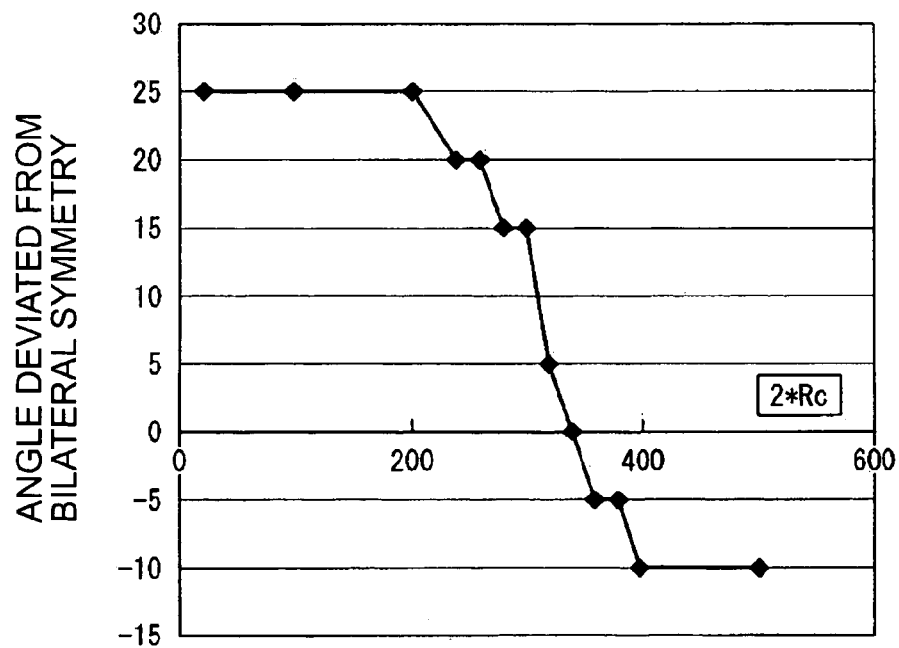
FIG. 7 is a view illustrating the relationship therebetween.
Figure 8:
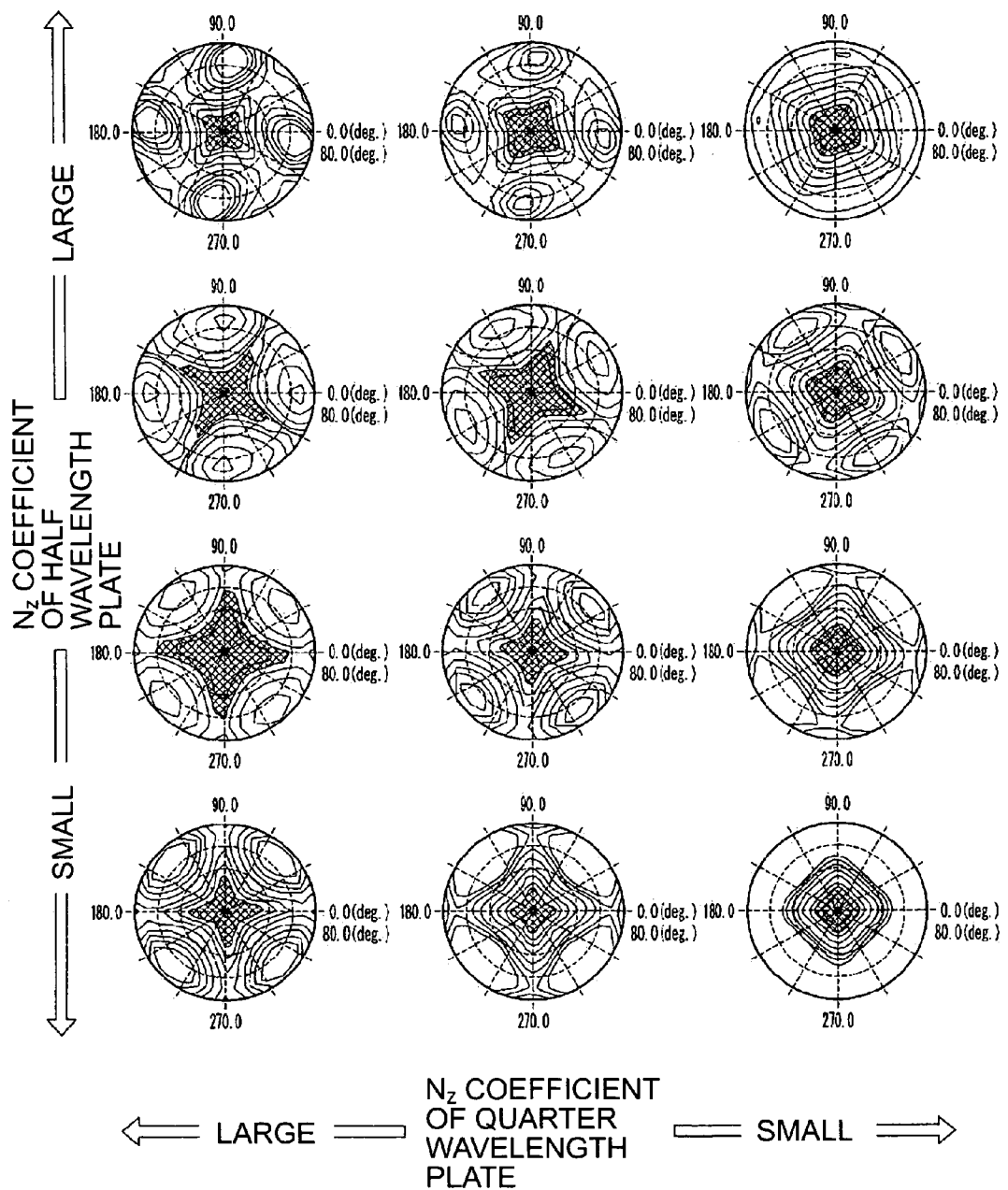
FIG. 8 is a view illustrating equi-brightness curves in black display when a $N_Z$ coefficient of each retardation plate is varied.
Figure 9A:
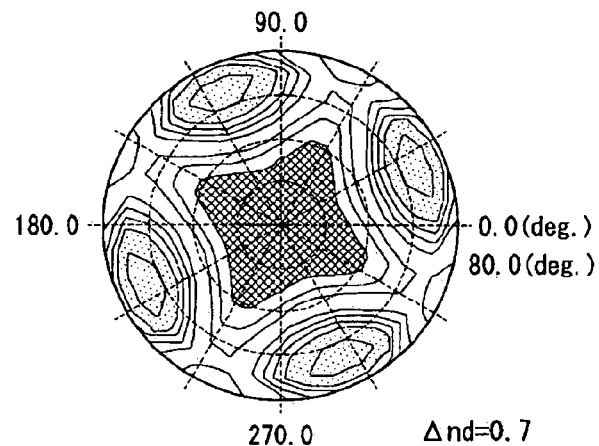
FIGS. 9A, 9B, and 9C are views respectively illustrating equi-brightness curves in black display when the retardation $\Delta n \cdot d$ of liquid crystal is varied.
Figure 9B:
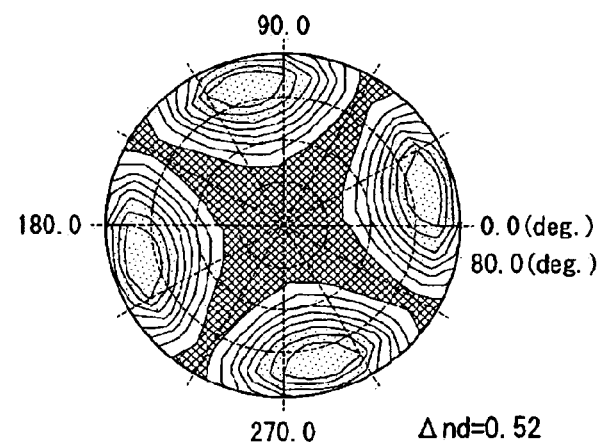
Figure 9C:
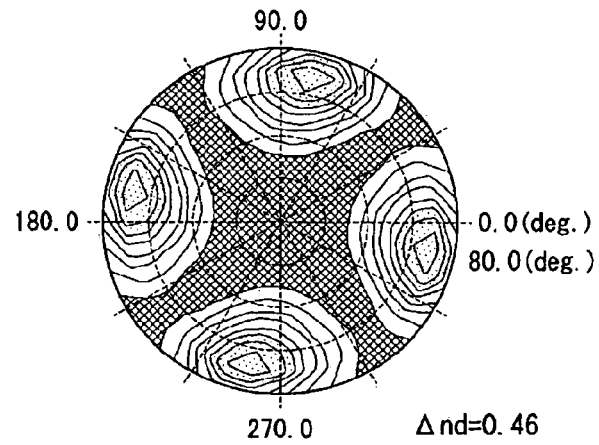
Figure 10A:
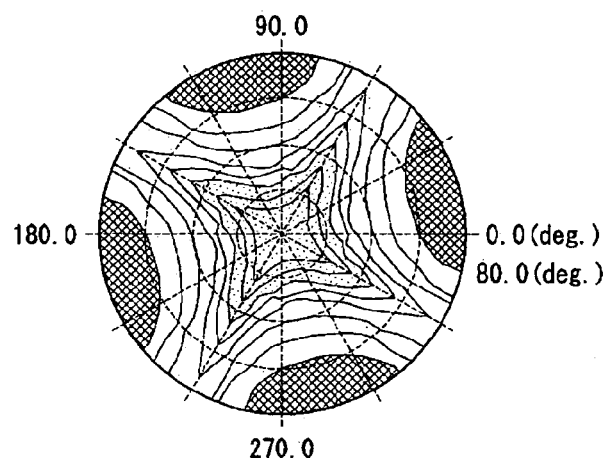
FIG. 10A is a view illustrating an equi-brightness curve in black display when an optical axis of a circularly polarizing plate at the light incident side is orthogonal to a circularly polarizing plate at the viewing side.
Figure 10B:
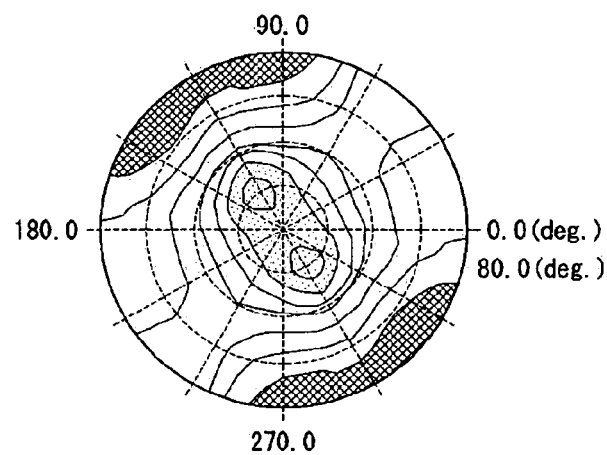
FIG. 10B is a view illustrating an equi-brightness curve in black display when the optical axis of the circularly polarizing plate at the light incident side is rotated with respect to the circularly polarizing plate at the viewing side by 45°.
Figure 10C:
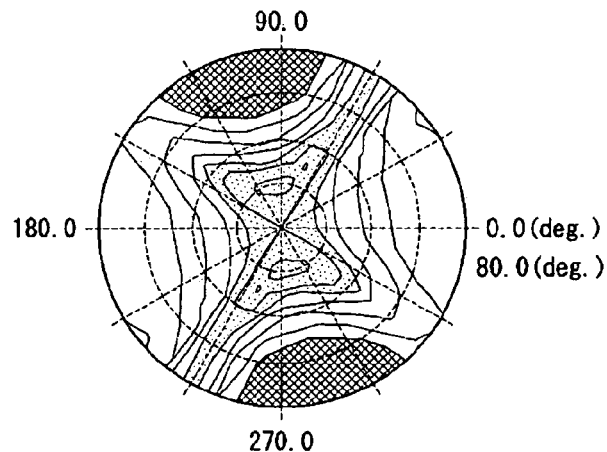
FIG. 10C is a view illustrating an equi-brightness curve in black display when the optical axis of the circularly polarizing plate at the light incident side is rotated with respect to the circularly polarizing plate at the viewing side by 90°.

In the second embodiment, the simulation results by the inventors proved that the circularly polarizing plate set provided at the viewing side should be rotated. However, in the case of the second embodiment, the angle to be rotated varies according to the phase difference by the C plate 162 or 182. FIGS. 6 and 7 show results obtained by changing the phase difference of the C plate to adjust the viewing angle characteristic in black display at a plurality of points. In FIGS. 6 and 7, the horizontal axis denotes the total amount of phase differences of the upper and lower C plates 162 and 182 (since the same C plates are used at the upper and lower sides, the phase difference becomes 2×Rc whose unit is nm), and the vertical axis denotes an angel (°) deviated from bilateral symmetry. FIG. 6 shows a case in which the value of Δn·d of the liquid crystal layer 50 is 0.4, and FIG. 7 shows a case in which the value of Δn·d of the liquid crystal layer 50 is 0.5.

As can be apparently seen from FIGS. 6 and 7, the angles deviated from the bilateral symmetry are respectively +25° and −10° in a region having a minimum value of Rc and a region having a maximum value of Rc, and thus the regions become saturated states. In these regions, even when the value of Rc varies, the angle of the circularly polarizing plate is the same. Thus, it is possible to secure bilateral symmetry at that angel. On the contrary, in the region between the maximum value of Rc and the minimum value of Rc, when the value of Rc varies, the angle deviated from the bilateral symmetry varies substantially linearly. Therefore, it is necessary to set the angle of the circularly polarizing plate at an angle corresponding to the value of Rc. In addition, the comparison between the results shown in FIGS. 6 and 7 proves that the angles of the circularly polarizing plate necessary for obtaining the bilateral symmetry by the value of Δn·d of the liquid crystal layer 50 are different from each other.

From the results, generalization is performed using the values of Rc and Δn·d. Then, in a case in which circularly polarized light rotating in the clockwise direction is incident on the liquid crystal layer 50, when the relationship 0.8×Δn·d−160<2×Rc<0.8×Δn·d−20 is satisfied, the horizontal direction of a display screen is set at an angle of 0°, the counterclockwise rotation is defined as a normal direction, and the angle of the absorption axis of the linearly polarizing plate 17 at the viewing side is θ1 (°), the angle θ1 is calculated from the relationship θ1=0.25×2×Rc−0.2×Δn·d+15±5. In addition, when the angle of the slow axis of the quarter-wave plate 16 at the viewing side is θ2 (°), the relationship θ2=θ1+45° is established. Further, when the relationship 2×Rc<0.8×Δn·d−160 is established, θ1=−25° and θ2=+20° are obtained. Furthermore, when the relationship 0.8×Δn·d−20<2×Rc is established, θ1=+10° and θ2=+55° are obtained. That is, a linear equation is obtained in the region in which Rc has an intermediate value.

On the other hand, in a case in which the circularly polarized light rotating in the counterclockwise direction is incident on the liquid crystal layer 50, when the relationship 0.8×Δn·d−160<2×Rc<0.8×Δn·d−20 is satisfied and when the angle of the absorption axis of the linearly polarizing plate 17 at the viewing side is θ1 (°), the angle θ1 is calculated from the relationship θ1=−0.25×2×Rc+0.2×Δn·d−15±5. In addition, when the angle of the slow axis of the quarter-wave plate 16 at the viewing side is θ2 (°), the relationship θ2=θ1−45° is established. Further, when the relationship 2×Rc<0.8×Δn·d−160 is satisfied, θ1=+25° and θ2=−20° are obtained. Furthermore, when the relationship 0.8×Δn·d−20<2×Rc is satisfied, θ1=−10° and θ2=−55° are obtained.

Electronic Apparatus

Next, an example of an electronic apparatus equipped with the liquid crystal display device according to the above-mentioned embodiments of the invention will be described below.

Figure 11:
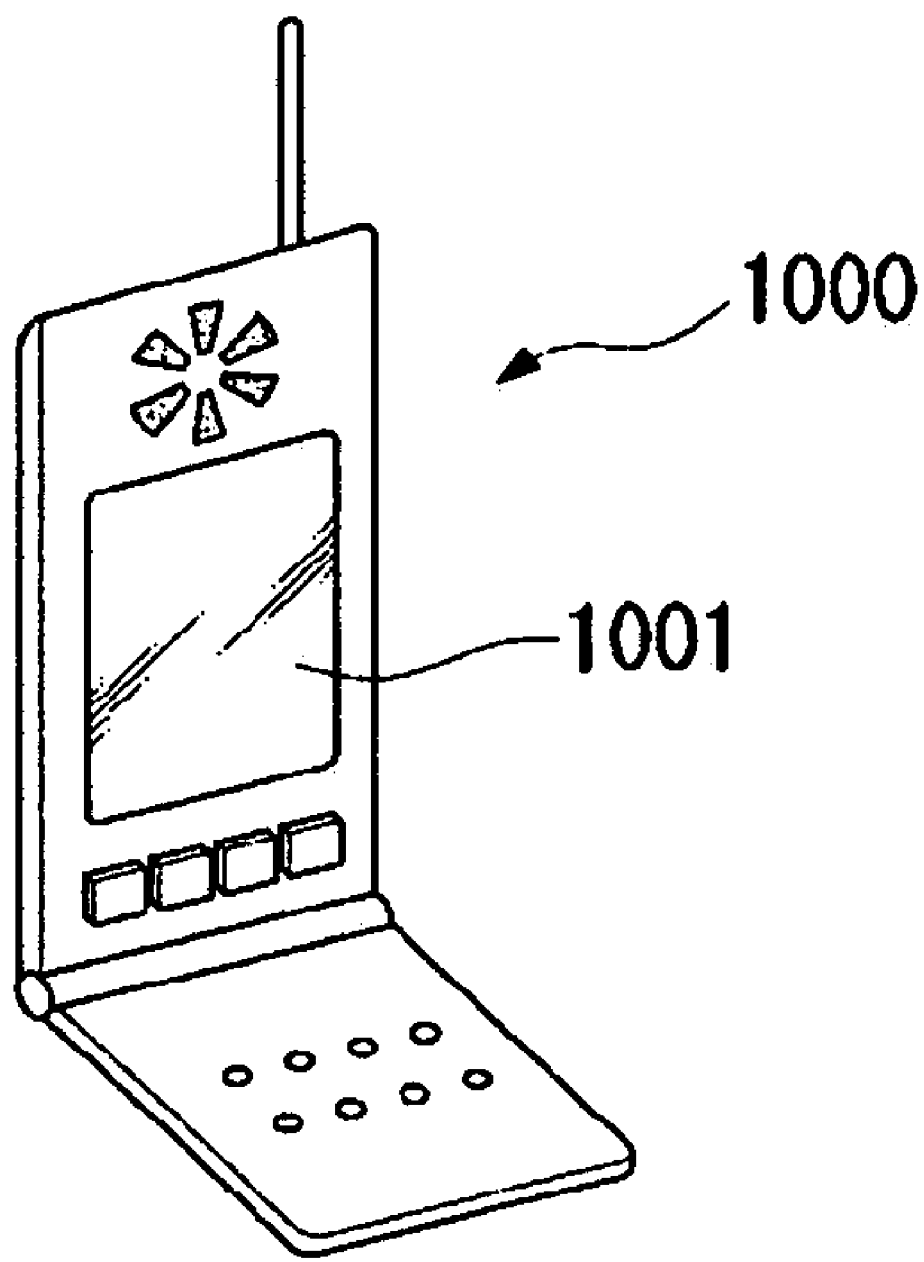
FIG. 11 is a perspective view illustrating an example of an electronic apparatus according to the invention.

FIG. 11 is a perspective view illustrating an example of a mobile phone. In FIG. 11, reference numeral 1000 denotes a main body of the mobile phone, and reference numeral 1001 denotes a display unit employing the above-mentioned liquid crystal display device. When the liquid crystal display device according to the above-mentioned embodiments are used for the display unit of the electronic apparatus, such as a mobile phone, it is possible to realize an electronic apparatus including a liquid crystal display unit having a wide viewing angle and high contrast.

The technical scope of the invention is not limited to the above-mentioned embodiments, and various modifications and changes may be made without departing from the scope and spirit of the invention. For example, although the invention has been applied to an active matrix liquid crystal display device employing TFTs as switching elements in the above-mentioned embodiments, the invention may be applied to an active matrix liquid crystal display device employing thin film diodes (TFDs) as the switching elements, a passive matrix liquid crystal display device, etc. In addition, the specific descriptions of materials, measures, shapes, etc., of various elements may be properly modified and changed. Further, an angel of absorption axis of a linearly polarizing plate at the viewing side and an angle of a slow axis of a quarter-wave plate at the viewing side can be formed at angles formed by simultaneously rotating the angles described in the above-mentioned embodiments by 90°.

What is claimed is:

1. A liquid crystal display device comprising:
   a viewing side substrate;
   another substrate opposing the viewing side substrate;
   a liquid crystal layer interposed between the viewing side substrate and the other substrate, the liquid crystal layer being composed of liquid crystal having a negative dielectric anisotropy;
   an other substrate circularly polarizing member provided outside the other substrate, the other substrate circularly polarizing member enabling substantially circularly polarized light to be incident on the liquid crystal layer; and
   a viewing side circularly polarizing member provided outside the viewing side substrate, the viewing side circularly polarizing member enabling substantially circularly polarized light to be incident on the liquid crystal layer, the viewing side circularly polarizing member including:
      a linearly polarizing plate;
      a first retardation plate that shifts the phase of the incident light by about a quarter wavelength; and
      a second retardation plate having substantially no phase difference in the plane thereof and having a phase difference in the normal direction thereof,
   the liquid crystal, the linearly polarizing plate, and the first and second retardation plates satisfying the following relationships:
   1) in the case that $0.8 \times \Delta n \cdot d - 160 < 2 \times Rc < 0.8 \times \Delta n \cdot d - 20$, then $\theta 1 = 0.25 \times 2 \times Rc - 0.2 \times \Delta n \cdot d + 15 +/- 5$ and $\theta 2 = \theta 1 + 45°$;

2) in the case that $2 \times Rc < 0.8 \times \Delta n \cdot d - 160$, then $\theta 1 = -25°$ and $\theta 2 = +20°$; and 3) in the case that $0.8 \times \Delta n \cdot d - 20 < 2 \times Rc$, then $\theta 1 = +10°$ and $\theta 2 = +55°$ wherein Rc is the phase difference of the second retardation plate,
   $\Delta n$ is the refractive index anisotropy of the liquid crystal,
   d is the thickness of the liquid crystal layer,
   $\theta 1$ is the angle of the absorption axis of the linearly polarizing plate with respect to a 0° horizontal direction of the viewing side circularly polarizing member in plan view assuming the counterclockwise rotation in plan view is positive, and
   $\theta 2$ is the angle of the slow axis of the first retardation plate with respect to a 0° horizontal direction of the viewing side circularly polarizing member in plan view assuming the counterclockwise rotation in plan view is positive.

2. A liquid crystal display device comprising:
   a viewing side substrate;
   another substrate opposing the viewing side substrate;
   a liquid crystal layer interposed between the viewing side substrate and the other substrate, the liquid crystal layer being composed of liquid crystal having a negative dielectric anisotropy;
   an other substrate circularly polarizing member provided outside the other substrate, the other substrate circularly polarizing member enabling substantially circularly polarized light to be incident on the liquid crystal layer; and
   a viewing side circularly polarizing member provided outside the viewing side substrate, the viewing side circularly polarizing member enabling substantially circularly polarized light to be incident on the liquid crystal layer, the viewing side circularly polarizing member including:
      a linearly polarizing plate;
      a first retardation plate that shifts the phase of incident light by about a quarter wavelength; and
      a second retardation plate having substantially no phase difference in the plane thereof and having a phase difference in the normal direction thereof, the liquid crystal, linearly polarizing plate, and the first and second retardation plates satisfying the following relationships:
   1) in the case that $0.8 \times \Delta n \cdot d - 160 < 2 \times Rc < 0.8 \times \Delta n \cdot d - 20$, then $\theta 1 = 0.25 \times 2 \times Rc + 0.2 \times \Delta n \cdot d - + 15 +/- 5$ and $\theta 2 = \theta 1 + 45°$;

2) in the case that $2 \times Rc < 0.8 \times \Delta n \cdot d - 160$, then $\theta 1 = +25°$ and $\theta 2 = -20°$; and 3) in the case that $0.8 \times \Delta n \cdot d - 20 < 2 \times Rc$, then
      $\theta 1 = -10°$ and
      $\theta 2 = -55°$
   wherein Rc is the phase difference of the second retardation plate,
   $\Delta n$ is the refractive index anisotropy of the liquid crystal,
   d is the thickness of the liquid crystal layer,
   $\theta 1$ is the angle of the absorption axis of the linearly polarizing plate with respect to a 0° horizontal direction of the viewing side circularly polarizing member in plan view assuming the counterclockwise rotation in plan view is positive, and
   $\theta 2$ is the angle of the slow axis of the first retardation plate with respect to a 0° horizontal direction of the viewing side circularly polarizing member in plan view assuming the counterclockwise rotation in plan view is positive.

3. The liquid crystal display device according to claim 1, wherein the absorption axes of the linearly polarizing plates in the other substrate circularly polarizing member and in the viewing side circularly polarizing member are substantially orthogonal and the slow axes of the retardation plates in the other substrate circularly polarizing member and in the viewing side circularly polarizing member are substantially orthogonal.

4. The liquid crystal display device according to claim 1, further comprising a plurality of pixels arranged in a matrix, the liquid crystal having an alignment division structure in each pixel.

5. The liquid crystal display device according to claim 4, wherein each pixel is provided with a transmissive display region that performs transmissive display and a reflective display region that performs reflective display.

6. A liquid crystal display device comprising:
a viewing side substrate;
another substrate opposing the viewing side substrate;
a liquid crystal layer interposed between the viewing side substrate and the other substrate, the liquid crystal layer being composed of liquid crystal having a negative dielectric anisotropy;
another substrate circularly polarizing member provided outside the other substrate, the other substrate circularly polarizing member enabling substantially circularly polarized light to be incident on the liquid crystal layer; and
a viewing side circularly polarizing member provided outside the viewing side substrate, the viewing side circularly polarizing member enabling substantially circularly polarized light to be incident on the liquid crystal layer, the viewing side circularly polarizing member including:
a linearly polarizing plate;
a first retardation plate that shifts the phase of the incident light by about a quarter wavelength; and
a second retardation plate having substantially no phase difference in the plane thereof and having a phase difference in the normal direction thereof, the liquid crystal, linearly polarizing plate, and the first and second retardation plates satisfying the following relationships:

1) in the case that $0.8 \times \Delta n \cdot d - 160 < 2 \times Rc < 0.8 \times \Delta n \cdot d - 20$, then $\theta 1 = 0.25 \times 2 \times Rc - 0.2 \times \Delta n \cdot d + 15 +/- 5$;

2) in the case that $2 \times Rc < 0.8 \times \Delta n \cdot d - 160$, then $\theta 1 = -25°$ and $\theta 2 = +20°$; and 3) in the case that $0.8 \times \Delta n \cdot d - 20 < 2 \times Rc$, then $\theta 1 = +10°$ and $\theta 2 = +55°$ wherein Rc is the phase difference of the second retardation plate,
$\Delta n$ is the refractive index anistropy of the liquid crystal,
d is the thickness of the liquid crystal layer,
$\theta 1$ is the angle of the absorption axis of the linearly polarizing plate with respect to a 0° horizontal direction of the viewing side circularly polarizing member in plan view assuming the counterclockwise rotation in plan view is positive, and $\theta 2$ is the angle of the slow axis of the first retardation plate with respect to a 0° horizontal direction of the viewing side circularly polarizing member in plan view assuming the counterclockwise rotation in plan view is positive.

7. A liquid crystal display device comprising:
a viewing side substrate;
another substrate opposing the viewing side substrate;
a liquid crystal layer interposed between the viewing side substrate and the other substrate, the liquid crystal layer being composed of liquid having a negative dielectric anisotropy and;
an other substrate circularly polarizing member provided outside the other substrate, the other substrate circularly polarizing member enabling substantially circulary polarized light to be incident on the liquid crystal layer, and
a viewing side circularly polarizing member provided outside the viewing side substrate, the viewing side circularly polarizing member enabling substantially circularly polarized light to be incident on the liquid crystal layer, the viewing side circularly polarizing member including:
a linearly polarizing plate;
a first retardation plate that shifts the phase of the incident light by about a quarter wavelength; and
a second retardation plate having substantially no phase difference in the plane thereof and having a phase difference in the normal direction thereof, the liquid crystal, linearly polarizing plate, and the first and second retardation plates satisfying the following relationships:

1) in the case that $0.8 \times \Delta n \cdot d - 160 < 2 \times Rc < 0.8 \times \Delta n \cdot d - 20$, then $\theta 1 = -0.25 \times 2 \times Rc + 0.2 \times \Delta n \cdot d + 15 +/- 5$;

2) in the case that $2 \times Rc < 0.8 \times \Delta n \cdot d - 160$, then $\theta 1 = +25°$ and $\theta 2 = -20°$; and 3) in the case that $0.8 \times \Delta n \cdot d - 20 < 2 \times Rc$, then $\theta 1 = -10°$ and $\theta 2 = -55°$ wherein Rc is the phase difference of the second retardation plate,
$\Delta n$ is the refractive index anistropy of the liquid crystal,
d is the thickness of the liquid crystal layer,
$\theta 1$ is the angle of the absorption axis of the linearly polarizing plate with respect to a 0° horizontal direction of the viewing side circularly polarizing member in plan view assuming the counterclockwise rotation in plan view is positive, and
$\theta 2$ is the angle of the slow axis of the first retardation plate with respect to a 0° horizontal direction of the viewing side circularly polarizing member in plan view assuming the counterclockwise rotation in plan view is positive.

* * * * *